(12) United States Patent
Ng et al.

(10) Patent No.: US 7,831,812 B2
(45) Date of Patent: Nov. 9, 2010

(54) METHOD AND APPARATUS FOR OPERATING AN AGE QUEUE FOR MEMORY REQUEST OPERATIONS IN A PROCESSOR OF AN INFORMATION HANDLING SYSTEM

(75) Inventors: Alvan Wing Ng, Austin, TX (US); Takuya Kano, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 11/848,492

(22) Filed: Aug. 31, 2007

(65) Prior Publication Data

US 2009/0063735 A1    Mar. 5, 2009

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/225
(58) Field of Classification Search ................... 712/225
See application file for complete search history.

(56) References Cited

U.S. PATENT DOCUMENTS

| | | |
|---|---|---|
| 6,292,807 B1 | 9/2001 | Larson |
| 6,321,233 B1 | 11/2001 | Larson |
| 6,895,454 B2 | 5/2005 | Barrick |
| 2003/0079068 A1* | 4/2003 | Barrick ........................ 710/52 |

OTHER PUBLICATIONS

Chung—Analysis of RED-Family Active Queue Management—IEEE INFOCOM (2003).
Jiang—A Robust RED Algorithm Based on Time-delayed Feedback control—ASCC Proceedings (2004).
SidKar—Queue Management Algorithms and Network Traffice Self-Similarity—2002 Workshop on High Performance Switching and Routing (HPSR) (2002).
Singhmar—A Combined LIFO-Priority Scheme for Overload Control of E-commerce Web servers—eprint arXiv:cs/0611087 (Nov. 17, 2006).

* cited by examiner

*Primary Examiner*—Eddie P Chan
*Assistant Examiner*—Corey Faherty
(74) *Attorney, Agent, or Firm*—Matt Talpis; Mark P Kahler

(57) ABSTRACT

A processor includes a processor core with a core interface unit that includes an age queue and a request queue. The core interface unit receives load requests from the processor core. The request queue stores the requests in respective slots of the request queue. The age queue stores ID tags in respective age queue slots. Each ID tag in the age queue corresponds to a respective address of a load instruction in the request queue. In one embodiment, ID tags propagate through the age queue at a fixed rate of two at a time from a tail of the age queue to a head of the age queue. Arbitration control circuitry generates an enable bit vector that identifies the oldest ID tag in the age queue corresponding to the oldest load request in the request queue. The arbitration circuitry selects the identified oldest instruction in the request queue as the next to dispatch. In one embodiment, the core interface unit exhibits an input frequency that is a multiple of an internal operating frequency of the core interface unit.

20 Claims, 5 Drawing Sheets

METHOD AND APPARATUS FOR OPERATING AN AGE QUEUE FOR MEMORY REQUEST OPERATIONS IN A PROCESSOR OF AN INFORMATION HANDLING SYSTEM

TECHNICAL FIELD OF THE INVENTION

The disclosures herein relate generally to information handling systems, and more particularly, to an information handling system that employs a processor with a queuing apparatus to control memory operations.

BACKGROUND

Modern information handling systems (IHSs) often employ processors that include multiple stages that together form a pipeline. For example, a pipelined processor may include a fetch unit, a decoder, an instruction queue, a number of execution units, and a completion or writeback unit. The fetch unit fetches instructions from a memory cache or system memory to provide an instruction stream. The decoder decodes the fetched instructions into opcodes and operands. An issue unit or dispatch unit sends decoded instructions to appropriate execution units for execution. A completion or writeback unit writes the completed results back to an appropriate processor register or memory. While one stage of the pipelined processor performs a task on one instruction, another stage performs a different task on another instruction. For example, the fetch unit fetches a first instruction from an instruction cache. Next, while the decoder decodes the fetched first instruction, the fetch unit fetches another instruction from the instruction cache. Breaking instruction handling into separate tasks or stages to form a pipeline in this manner may significantly increase processor performance.

Together, the fetch unit, the decoder, the issue unit and the execution units may form a processor core. A processor may include multiple processor cores to increase performance. The processor cores of more advanced processors may employ an issue unit that includes an issue queue to enable out-of-order execution of instructions. The issue queue dispatches instructions that exhibit no dependencies to execution units for execution. When an instruction exhibits a dependency, it remains in the issue queue until resolution of the dependency. The issue queue dispatches younger instructions without dependencies to the execution units while an instruction with a dependency remains in the issue queue.

The execution units of a processor core typically include a load/store execution unit (LSU), an integer execution unit and a floating point execution unit. The load/store execution unit (LSU) handles load/store requests from the other execution units. A core interface unit may interface the load/store unit (LSU) of a processor core to a memory cache and system memory to enable the LSU to access memory data. The LSU, acting as a master, may issue requests to fetch data from the cache memory or system memory. Some core interface units may employ an age queue to track the age of each load/store request. It is generally desirable that the processor service older memory requests ahead of younger memory requests. Thus, tracking the age of the requests with an age queue is helpful.

One conventional type of age queue is a first-in first-out (FIFO) age queue. Unfortunately, while relatively simple to implement, a delay in the servicing of any request in the queue may block the servicing of any requests that follow in the FIFO age queue. Another conventional approach is to implement an age queue that allows for out-of-order load/store requests. In such as approach, the age queue tracks the age of each load/store request. However, if a particular load/store request is not immediately serviceable, then the core interface unit services the next oldest load/store as determined by age information stored in the age queue. One problem with this approach is that holes form in the age queue when load/store requests complete out-of-order. The age queue may require a sophisticated shifter to handle these holes. When a load/store request enters the age queue, it proceeds directly to the end of the queue (i.e. the head of the queue) or as deep into the queue as possible without being blocked by an entry corresponding to another load/store request. As holes form in the age queue, age queue control logic may need to shift the pending requests down to plug the holes. In a system where multiple new requests can enter the queue and multiple serviced requests can complete out-of-order in the same cycle, one may expect the complexity of the shifter control to grow significantly to manage the adding and removal of queue entries. This approach becomes very expensive to implement at high frequencies and consumes substantial amount of power. This approach may also become less practical as the queue depth increases.

What is needed is a processor apparatus and methodology that addresses the age queue request handling problems above.

SUMMARY

Accordingly, in one embodiment, a method is disclosed for servicing load requests in a processor. The method includes generating, by a processor core, a plurality of load requests wherein each load request exhibits an address. The method also includes receiving, by a core interface unit, the load requests at an input of the core interface unit. The method further includes storing, by a request queue in the core interface unit, the load requests in respective slots of the request queue. The method still further includes storing, by an age queue in the core interface unit, ID tags in respective slots of the age queue, each ID tag in the age queue identifying the address of a respective load request in the request queue. The age queue includes a tail at which ID tags enter the age queue. The age queue further includes a head. The method also includes advancing, by the age queue, ID tags from the tail of the age queue toward the head of the age queue by a fixed rate corresponding to a predetermined number of age queue slots per clock cycle, the positions of the ID tags within the age queue indicating the relative ages of respective load requests in the request queue.

In another embodiment, a processor is disclosed that generates a plurality of load requests, each load request exhibiting an address. The processor includes a core interface unit, coupled to the processor core, that receives the plurality of requests from the processor core. The core interface unit includes an input that receives load requests. The core interface unit includes a request queue, coupled to the input, that includes a plurality of request queue slots that store the respective load requests. The core interface unit also includes an age queue, coupled to the input, that includes a plurality of age queue slots that store respective ID tags, each ID tag in the age queue identifying the address of a respective load request in the request queue. The age queue includes a tail at which ID tags enter the age queue. The age queue further includes a head. The age queue ID tags advance from the tail of the age queue toward the head of the age queue by a fixed rate corresponding to a predetermined number of age queue slots per clock cycle. The positions of the ID tags within the age queue indicate the relative ages of respective requests in the request queue. The processor also includes a memory, coupled to the core interface unit, that stores data specified by the load requests.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
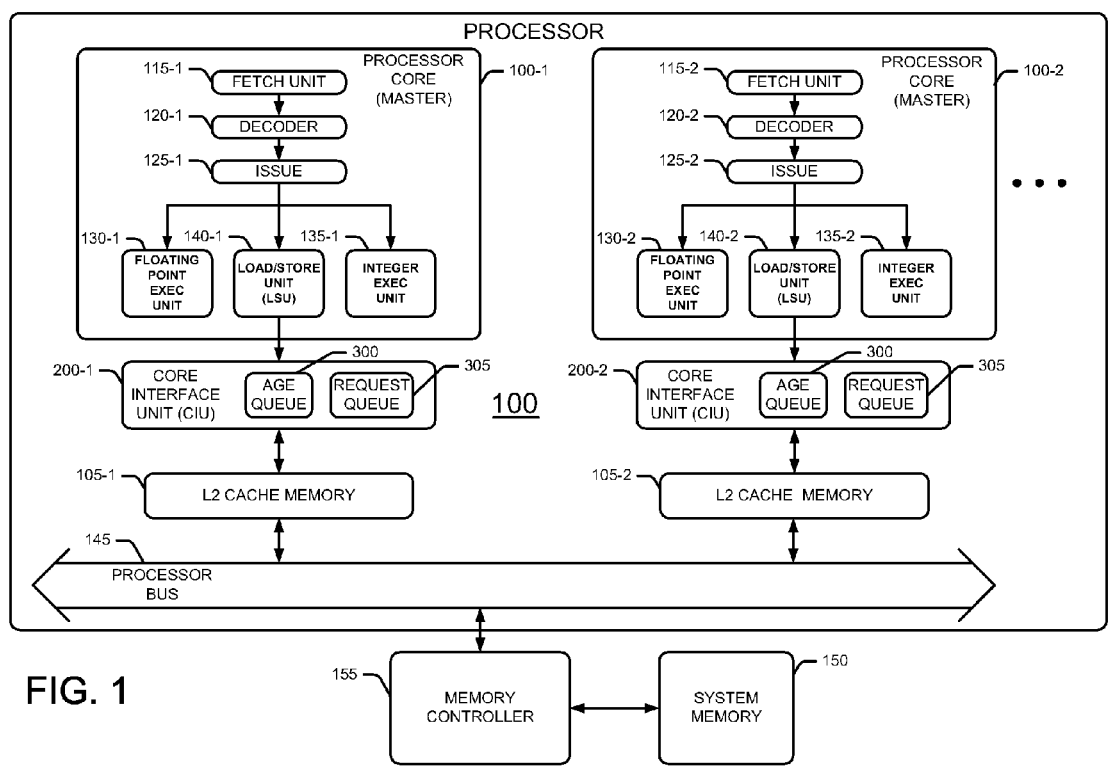
FIG. 1 shows a block diagram of one embodiment of the disclosed processor.

FIG. 1 depicts one embodiment of the disclosed multi-core processor 100 that includes processor cores 100-1 and 100-2. Processor cores 100-1 and 100-2 act as masters that may request data from L2 cache memories 105-1 and 105-2. Alternatively, processor cores 100-1 and 100-2 may request data from system memory 150. Such a data request may take the form of a load request.

Processor core 100-1 is representative of the processor cores in processor 100. Processor core 100-1 includes a fetch unit 115-1 that fetches a stream of instructions from L2 cache memory 105-1 or system memory 150. Instructions in the instruction stream include opcodes and operands. Fetch unit 115-1 is the first stage of the pipeline of processor core 100-1. Fetch unit 115-1 couples to an instruction decoder 120-1 that decodes the fetched instruction stream thus providing a decoded instruction stream. Decoder 120-1 is another stage of the pipeline of processor core 100-1. Instruction decoder 120-1 decodes fetched instructions into their constituent opcodes and operands. Decoder 120-1 couples to an issue unit 125-1 that issues instructions to execution units for execution. Processor core 100-1 includes the following execution units: floating point execution unit 130-1, integer execution unit 135-1 and load/store unit (LSU) 140-1. The issue unit 125-1 is another stage of the pipeline of processor core 100-1. The execution units 130-1, 135-1 and 140-1 form yet another stage of the pipeline of processor core 100-1.

A core interface unit (CIU) 200-1 couples LSU 140-1 to L2 cache memory 105-1. A processor bus 145 couples L2 cache memory 105-1 to system memory 150 via memory controller 155 as shown. CIU 200-1 includes an age queue 300 and a request queue 305. Request queue 305 stores requests for data (e.g. load requests) that CIU 200-1 receives from LSU 140-1. Age queue 300 tracks the age of each of the requests in request queue 305.

While an embodiment is possible wherein processor 100 includes a single core such as core 100-1, in the particular embodiment of FIG. 1 processor 100 includes multiple cores. For example, processor 100 may include other cores such as processor core 100-2 and even more cores as indicated by the ellipsis to the right of processor core 100-2 in FIG. 1. In this embodiment, processor core 100-2 substantially replicates the structure of processor core 100-1. Like numbers indicate like elements when comparing processor core 100-2 and 100-1. Processor core 100-2 includes a fetch unit 115-2, decoder 120-2 and issue unit 125-2 that couple together as pipeline stages. Issue unit 125-2 couples to execution units, namely floating point execution unit 130-2, integer execution unit 135-2 and LSU 140-2. These execution units form another pipeline stage that couples to core interface unit (CIU) 200-2. CIU 200-2 includes an age queue 300 and a request queue 305 that perform the same functions for processor core 100-2 that age queue 300 and request queue 305 perform for processor core 100-1. CIU 200-2 couples to system memory 150 via L2 cache memory 105-2, processor bus 145 and memory controller 155 as shown.

Load/store unit (LSU) 140-1 issues load requests to fetch data from memory. Request queue 305 stores these requests. CIU 200-1 first attempts to locate the requested data in L2 cache memory 105-1. However, if that attempt is not successful, then CIU 200-1 may attempt to retrieve the requested data from system memory 150 via processor bus 145 and memory controller 155. Age queue 300 tracks the age of these load requests to L2 cache memory 105-1 or system memory 150. Based on the respective ages of these load requests, CIU 200-1 prioritizes the load requests.

Figure 2:
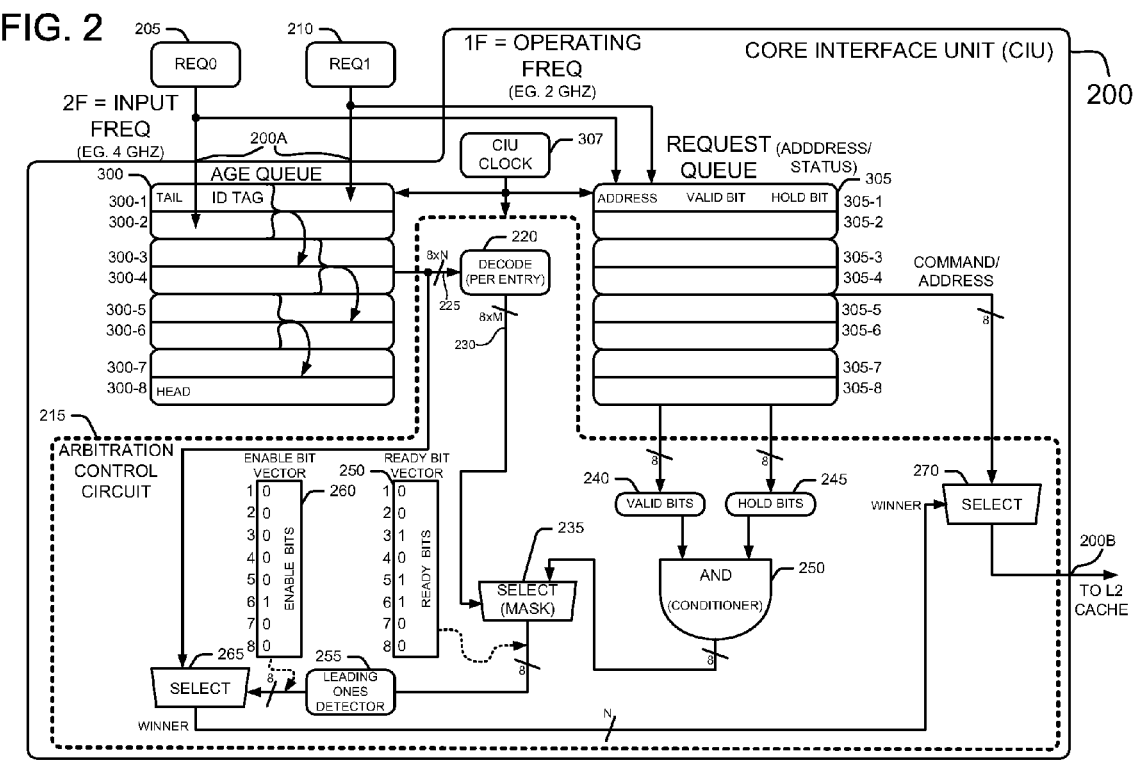
FIG. 2 shows a block diagram of a core interface unit that the disclosed processor may employ.

FIG. 2 shows a more detailed view of core interface unit (CIU) 200 which is usable as core interface unit 200-1 or 200-2 in processor 100. CIU 200 receives requests for data, e.g. load requests, from a request source or request generator such as load store unit 140-1. Load requests include requests for data in system memory 150. In this particular embodiment, CIU 200 receives two load requests or instructions at a time, namely REQ0 and REQ1, from registers 205 and 210, respectively. The outputs of registers 205 and 210 together form the input 200A of CIU 200, while 200B is the output of CIU 200. In one embodiment, CIU 200 includes REQ register 205 and REQ register 210 inside CIU 200. CIU 200 includes age queue 300 and request queue 305 that each couple to the input 200A of CIU 200, namely registers 205 and 210 as shown in FIG. 2. In this particular embodiment, age queue 300 includes storage locations or slots 300-1, 300-2, ... 300-8 and request queue 305 includes storage locations or slots 305-1, 305-2, ... 305-8. Age queue 300 and request queue 305 may have a greater or lesser number of slots than the 8 depicted slots depending on the particular application. However, in the illustrated embodiment, age queue 300 and request queue 305 include the same number of slots.

Request queue 305 stores the requests or load instructions that it receives from registers 205 and 210 in slots 305-1, 305-2, ... 305-8. More particularly, request queue 305 stores the addresses of these requests in respective slots along with status information for each of these requests. The status information in each request's slot includes a valid bit and a hold bit for that particular request, as explained in more detail below. While request queue 305 stores requests and corresponding status information, age queue 300 stores request ID tags that point to respective requests in request queue 305. Slot 300-8 is the head or bottom of age queue 300 and slot 300-1 is the tail or top of age queue 300. Request ID tags do not move immediately to the head 300-8 or bottom of age queue 300 upon entering age queue 300 at the tail 300-1 or top of age queue 300. Rather, request ID tags move as a pair within age queue 300, namely two tags by two tags, from tail pair 300-1, 300-2 at the top to tail pair 300-7, 300-8 at the bottom. Generally, the lower a request ID tag moves in age queue 300, the older is the request to which the request ID tag corresponds. Age queue 300 tracks the ages of the request ID tags therein by virtue of their respective positions or locations within age queue 300. Since age queue 300 tracks the age of the request ID tags therein, the requests do not have to move within request queue 305 each time a respective request ID tag moves downward in age queue 300. This approach simplifies the structure of request queue 305. Older ID tags propagate through age queue 300 at a fixed rate of 2 at a time toward head 300-8. New ID tags, representing the addresses of new requests in request queue 305, enter age queue 300 at tail 300-1 and propagate downward toward head 300-8 at a fixed rate of 2 slots per CIU clock cycle in one embodiment. Thus, new requests do not immediately proceed to the head 300-8 of age queue 300 when age queue 300 is empty.

CIU 200 includes a CIU clock 307 that operates a frequency F. CIU 200 controls the internal operating frequency of CIU 200. CIU 200 couples to age queue 300, request queue 305 and other components of CIU 200 to control the operating frequency thereof. While these connections are not specifically shown, the arrows extending from CIU clock 307 represent connections to the components of CIU 200 to set the clock frequency of those components.

While CIU 200 exhibits an internal operating frequency of F, the external input frequency at input 200A is 2xF until age queue 300 fills in one embodiment. CIU 200 may exhibit an external input frequency at input 200A that is a multiple of the internal operating frequency of CIU 200. For example, if the external input frequency of CIU 200 is 4 GHz and the internal operating frequency of CIU 200 is 2 GHz, then for each internal 2 GHz frequency CIU clock cycle, two requests enter input 200A, namely requests REQ0 and REQ1 as shown. Request REQ0 enters input 200A during the first half of a CIU clock cycle and request REQ1 enters input 200A during the second half of that CIU clock cycle. Thus, by convention, request REQ0 is older than request REQ1 in this arrangement.

The two requests REQ0 and REQ1 enter input 200A and propagate from the tail to the head of age queue 300 by two slots per 2 GHz clock cycle. For example, when requests REQ0 and REQ1 initially enter CIU 200, request ID tags corresponding to these requests occupy slots 300-1 and 300-2. In the next CIU clock cycle, these request ID tags move to slots 300-3 and 300-4 while ID tags corresponding to younger instructions enter slots 300-1 and 300-2. In the following CIU clock cycle, the request ID tags in slots 300-3 and 300-4 move to slots 300-5 and 300-6. In the next CIU clock cycle, the request ID tags in slots 300-5 and 300-6 move to slots 300-7 and 300-8. In this embodiment, the request ID tags that enter age queue 300 do not immediately propagate to the head or bottom of the age queue at head or slot 300-8, but rather propagate toward the head at a fixed rate of two slots for each CIU clock cycle, provided no stall occurs.

The ID tag in each of slots 300-1, 300-2, ... to 300-8 in age queue 300 acts as a pointer to a particular respective request in request queue 305. Such a request in one of request queue slots 305-1, 305-2, ... to 305-8 includes the address of the actual request instruction, a valid bit and a hold bit for that request. ID tags that correspond to requests in request queue 305 propagate two by two through age queue 300. The position of a particular ID tag within age queue 300 indicates the age of the ID tag relative to other ID tags. Older ID tags for older requests propagate toward the head 300-8 of age queue 300 while younger ID tags for younger requests are closer to the tail 300-1 of age queue 300. Since the movement of ID tags in age queue 300 tracks the age of respective requests corresponding to those ID tags, the requests and status information in request queue 305 need not move each time an ID tag propagates lower in age queue 300.

It is possible that a request may stall while CIU 200 processes the request. In this event, CIU 200 allows for out-of-order execution of requests that follow the stalled request. Age queue 300 and request queue 305 couple to arbitration control circuit 215 as shown. Arbitration control circuit 215 provides a mechanism to select the next request that should exit CIU output 200B in the event of a stalled request. Arbitration control circuit 215 selects the next oldest request after the stalled request and outputs that request at 200B for servicing by memory.

Arbitration control circuit 215 includes a decoder circuit 220 that couples to each of the age queue slots 300-1, 300-2, ... 300-8 via 8xN interconnect bus 225, wherein N represents the width of the ID tag. In one embodiment, each ID tag in an age queue slot may employ encoded address bits to reference or point to a respective load request in request queue 305. The purpose of decoder circuit 220 is to decode the ID tag that each slot of age queue 300 stores as an entry. Decoder 220 translates each N bit ID tag to an M bits one-hot style multiplexer control signal, wherein M is equal to $2^N$. Decoder circuit 220 generates 8 one-hot style multiplexer select vectors at its output, as noted by 8xM bus 230, wherein M represents the one-hot decoding of the N bits wide ID tag, wherein M is equal to $2^N$. The output of decoder 220 couples to one of the 8 inputs of select circuit 235. In one embodiment, select circuit 235 is a one-hot style multiplexer (mux) circuit. Alternatively, it is possible to use the encoded ID tags directly as encoded multiplexer select controls. In that case, M is equal to N. The decoder circuit 220 is not needed and reduces to a set of 8xN buses. The select circuit 235 may employ multi-stage encoding type multiplexers in this alternative embodiment.

As noted above, each entry in a respective slot of request queue 305 includes request address information, a valid bit and a hold bit. The request address information is the address of a particular request in memory, such as L2 cache memory 105-1 or system memory 150. When a request enters a slot of request queue 305 from register 205 or register 210, the request queue 305 sets the valid bit of that request's slot to VALID=1, wherein VALID=1 signifies that a request is present. VALID=0 indicates that a request is not present in the slot or that the request in the slot is invalid. The hold bit for that particular request may be set to 0 (HOLD=0) if CIU 200 can not currently be dispatched for some reason. Alternatively, request queue 305 sets the hold bit to 1 (HOLD=1) if the request may currently be dispatched, as discussed in more detail below.

One reason why request queue 305 may need to hold a request and not dispatch the request is that the request attempts to access a resource (e.g. cache or system memory) that is currently busy. In that event, the CIU may attempt an access to the resource at a later time when the resource is available. In this scenario, the request is valid upon entering request queue 305 and thus request queue 305 sets the request's valid bit to 1 (VALID=1). However, since the data that the request seeks in memory is not currently available, request queue 305 sets the hold bit of the request to 0 (HOLD=0). CIU 200 later performs a retry to see if the resource that the request needs is now available. Once the resource becomes available and there is no more need for a hold, the request queue 305 sets that requests' hold bit to 1 (HOLD=1). At this point, the request becomes available for dispatch as determined by the request's age in age queue 300.

A valid bit latch circuit 240 couples to each of the request slots 305-1, 305-2, ... 305-8 to receive each of the valid bits from these slots. A hold bit latch circuit 245 couples to each of the request slots 305-1, 305-2, ... 305-8 to receive the hold bits from these slots. A conditioner circuit 250 couples to valid bit latch circuit 240 and hold bit latch circuit 245 to condition the hold and latch bits by performing a logical AND operation on the hold bit and valid bit from each respective load request in request queue 305. The output of conditioner circuit 250 couples to the remaining input of select circuit 235 to provide an 8 bit result of the ANDing operation thereto. In one embodiment, select circuit 235 is a multiplexer (mux). Table 1 is a truth table that shows various possible outputs of conditioner circuit 250 that depend on the valid bit and hold bit inputs of conditioner circuit 250. Conditioner circuit 250 performs 8 logical AND operations on the valid bits and hold bits of the respective 8 slots of request queue 305 per CIU 200 clock cycle.

TABLE 1

| VALID bit (VALID latch circuit 240) | HOLD bit (HOLD latch circuit 245) | CONDITIONER CIRCUIT 250 OUTPUT |
|---|---|---|
| 0 | 0 | 0 |
| 0 | 1 | 0 |
| 1 | 0 | 0 |
| 1 | 1 | 1 |

For a particular request in a request queue slot to be potentially ready for dispatch, both the valid bit and the hold bit must exhibit a logic 1 in this particular embodiment. If the valid bit VALID=0, then the slot does not contain a valid request. If the hold bit HOLD=0, then the request queue slot is holding the request due to a problem such as a resource not being available. In that case, CIU 200 will attempt a retry later. However, as stated above, when both the valid bit and hold bit exhibit a logic 1 or high, then the output of conditioner circuit 250 for that particular request is also a logic 1. This signifies that this particular request may be available for further consideration for dispatch by arbitration control circuit 215.

The 8 bit output of conditioner circuit 250 couples to the data input of each of the 8 multiplexers inside select circuit 235. Each set of the 8 multiplexer select controls from decode circuit 220 couples to each multiplexer's select control input of select circuit 235. The multiplexer select controls from the decode circuit 220 provide data selection signals to the multiplexers in select circuit 235. More particularly, the multiplexer select controls from decode circuit 220 pick the status of the selected request queue slots 305-1, 305-2, . . . 305-8. Each multiplexer of select circuit 235 corresponds to a respective one of age queue slots 300-1, 300-2, . . . 300-8. Select circuit 235 outputs an 8 bit "ready bit" vector 250 that FIG. 2 depicts with a dashed arrow line adjacent the output of select circuit 235. Each bit of the 8 bit "ready bit" vector 250 corresponds to a respective one of age queue slots 300-1, 300-2, . . . 300-8.

The multiplexer select controls (8xM) from decode circuit 220 provides 8 sets of data selection signals (of M bits wide each) to the 8 multiplexers in select circuit 235. Each set of multiplexer select control signals corresponds to a respective one of age queue slots 300-1, 300-2, . . . 300-8. Decoder 220 generates each set of multiplexer select control signals from the ID tag that age queue 300 stores in a respective slot. The ID tag encodes the physical location, namely the address, where the processor 100 stores the request. Each multiplexer of select circuit 235 corresponds to a respective one of age queue slots 300-1, 300-2, . . . 300-8.

The 8 bit output of conditioner circuit 250 provides dispatch readiness status of the request queue slots 305-1, 305-2, . . . 305-8, one bit per request queue slot. This set of 8 status bits serves as data input that is common to all 8 multiplexers in select circuit 235. Each multiplexer in select circuit 235 multiplexes the 8 bits input from the conditioner circuit 250 down to 1 bit. Decode circuit 220 controls this selection by decoding the ID tag that a respective age queue slot stores. In effect, each multiplexer of select circuit 235 generates a single bit ready status for its respective age queue slot to indicate the dispatch readiness status of the particular request to which the ID tag in that slot points.

Table 2A below shows representative status bit values (e.g. valid and hold bit values) and respective conditioner 250 conditioned status output values that conditioner circuit 250 may generate for 8 request queue positions or slots of request queue 305.

TABLE 2A

| REQUEST QUEUE SLOT POSITION | VALID BIT | HOLD BIT | CONDITIONER OUTPUT |
|---|---|---|---|
| 305-1 | 1 | 1 | 1 |
| 305-2 | 1 | 0 | 0 |
| 305-3 | 0 | 1 | 0 |
| 305-4 | 1 | 0 | 0 |
| 305-5 | 0 | 1 | 0 |
| 305-6 | 1 | 1 | 1 |
| 305-7 | 1 | 1 | 1 |
| 305-8 | 0 | 0 | 0 |

Table 2B below shows representative ID tags that age queue 300 may store in the respective slots 300-1, 300-2, . . . 300-8 thereof. Table 2B further shows a ready bit vector 250, an enable bit vector 260, and the corresponding winning tag from age queue 300 that the enable bit vector 260 specifies. Ready bit vector 250 identifies age queue 300 slots that contain ID tags that correspond to respective requests in request queue 305 that are ready for dispatch or issue. Of these ID tags, enable bit vector 260 identifies the particular ID tag that is the oldest ID tag in age queue 300 that corresponds to a request in request queue 305 that is ready to issue, i.e. the next request to dispatch or issue. This particular tag is the winning tag shown in Table 2B. The winning tag identifies the winning request in request queue 305, also as shown in Table 2B. The winning request is the next request that select circuit 270 issues at output 200B.

TABLE 2B

| AGE QUEUE SLOT POSITION | ID TAG | READY BIT VECTOR (250) | ENABLE BIT VECTOR (260) | WINNER (TAG FROM AGE QUEUE) (at SELECT CIRCUIT 265) | WINNER (REQUEST FROM REQUEST QUEUE) (at SELECT CIRCUIT 270) |
|---|---|---|---|---|---|
| 300-1 | 4 | 0 | 0 | — | — |
| 300-2 | 5 | 0 | 0 | — | — |
| 300-3 | 6 | 1 | 0 | — | — |

TABLE 2B-continued

| AGE QUEUE SLOT POSITION | ID TAG | READY BIT VECTOR (250) | ENABLE BIT VECTOR (260) | WINNER (TAG FROM AGE QUEUE) (at SELECT CIRCUIT 265) | WINNER (REQUEST FROM REQUEST QUEUE) (at SELECT CIRCUIT 270 |
|---|---|---|---|---|---|
| 300-4 | 3 | 0 | 0 | — | — |
| 300-5 | 1 | 1 | 0 | — | — |
| 300-6 | 7 | 1 | 1 | ID TAG = 7 (from age queue slot 300-6) | REQUEST ADDRESS (from request queue slot 305-7) |
| 300-7 | 2 | 0 | 0 | — | — |
| 300-8 | 8 | 0 | 0 | — | — |

The 8 bit output of select circuit 235 couples to the 8 bit input of leading ones detector 255. The leading ones detector 255 generates an 8 bit "enable bit" vector 260 at the output of detector 255. In the age queue example shown in Table 2B, leading ones detector 255 analyzes the ready bit vector 250 to determine the lowermost bit position of the ready bit vector 250 that exhibits a logic 1 value, i.e. the leading one closest to the head. In response, detector 255 sets the corresponding bit position of enable bit vector 260 to a logic 1 and all remaining bits of enable bit vector 260 to a logic 0. In the example of Table 2B, leading ones detector 250 determines that bit position 300-6 of the ready bit vector 250 is the lowermost bit that exhibits a logic 1. Thus, in response, leading ones detector 255 generates the enable bit vector 260 shown in Table 2B, wherein bit position 300-6 of the enable bit vector 260 exhibits a logic 1 and all remaining bit positions exhibit a logic 0.

The enable bit vector 260 acts as a "1 hot" pointer that points to the particular slot of age queue 300 that corresponds to the winner of the arbitration, namely the next memory or data request that CIU 200 should attempt to execute. In this particular example, enable bit vector 260 acts as a 1 hot pointer to slot 300-6 of age queue 300 because bit 6 of the enable bit vector is a logic 1 while the remaining bits are a logic 0. For purposes of this example, age queue slot 300-6 stores an ID tag 7 (ID TAG=7). This ID TAG=7 points to the address in the 7$^{th}$ slot of request queue 305, namely slot 305-7. To actually select age queue slot 300-6, the output of leading ones detector 255 provides the enable bit vector 260 to the select control input of select circuit 265. Select circuit 265 is a multiplexer. The remaining data input of select circuit 265 couples to age queue slots 300-1, 300-2, . . . 300-8 as shown. In this manner, select circuit 265 selects the ID tag that age queue 300 stores in slot 300-6 (namely ID TAG=7) and thus that particular ID tag appears at the output of select circuit 265 as the winner of the arbitration.

The output of select circuit 265 couples to an input of select circuit or multiplexer 270 to provide the ID tag of the winner thereto. This ID tag points to a particular address in one of slots 305-1, 305-2, . . . 305-8 that stores the actual address of the winner request in memory. Select circuit 270 includes inputs that couple to address outputs for each of request queue slots 305-1, 305-2, . . . 305-8. In the present example, wherein the ID tag (ID TAG=7) points to the address in slot 305-7 of request queue 305, select circuit 270 sends the address in request queue slot 305-7 to the output of select circuit 270 as the winner of the arbitration. The output 200B of CIU 200 couples to an L2 cache or other memory. CIU output 200B sends the address of the winner that request queue 305 stores in slot 305-6 to the L2 cache or other memory for execution, namely retrieval of the requested data.

Figure 3:
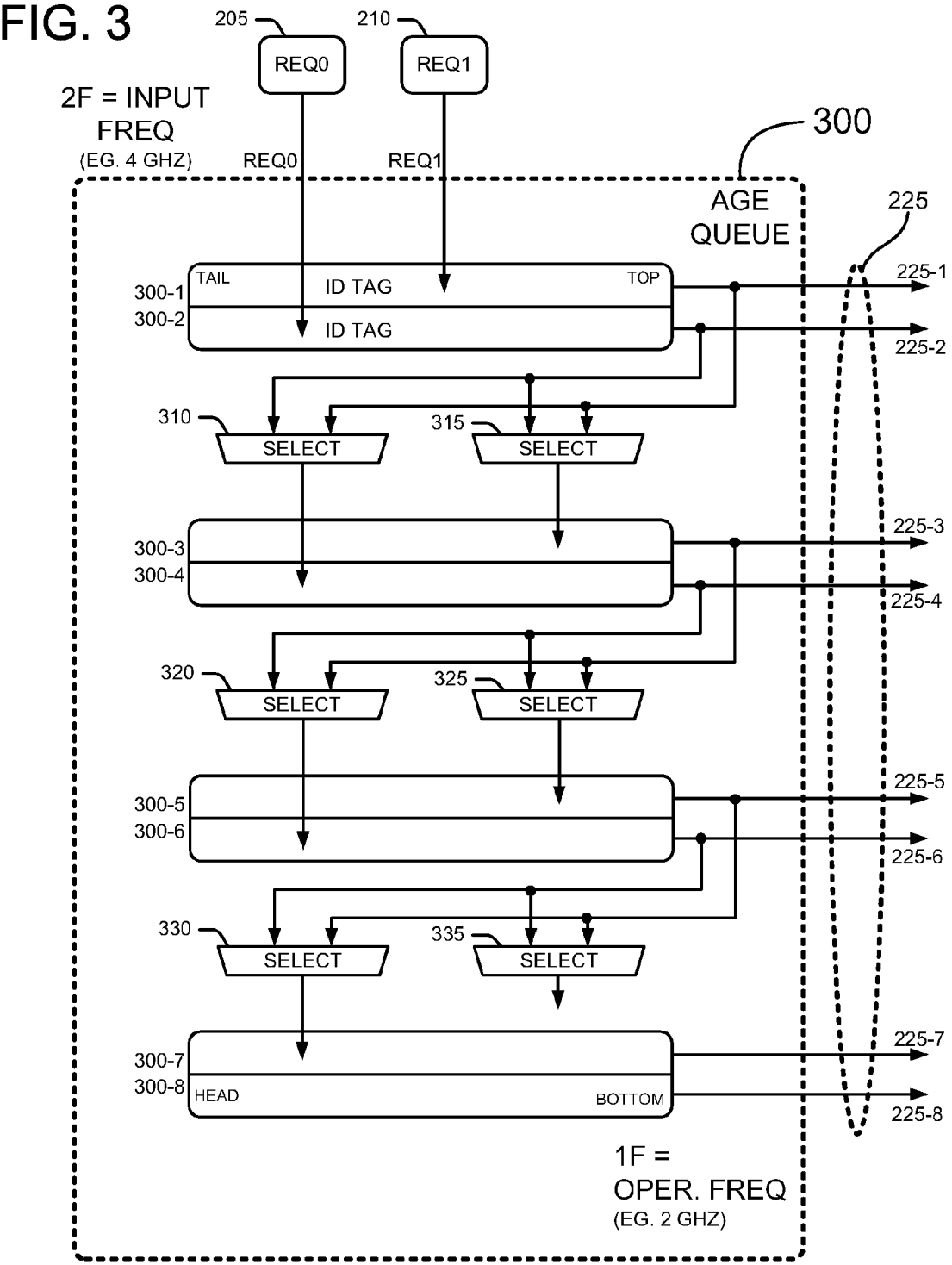
FIG. 3 shows a block diagram of an age queue within the core interface unit.

FIG. 3 is a more detailed diagram of age queue 300 of FIG. 2. Age queue 300 includes storage slots 300-1, 300-2, . . . 300-8, namely one slot for each slot of request queue 305 of FIG. 2. Slots 300-1, 300-2, . . . 300-8 store respective ID tags that correspond to instructions that the slots of request queue 305 store. Age queue 300 receives two load requests or instructions at a time, namely REQ0 and REQ1, from registers 205 and 210, respectively. Age queue 300 stores ID tags corresponding to these two requests in respective slots 300-2 and 300-1, as shown. Age queue 300 includes select circuits (multiplexers) 310 and 315 that enable ID tags in slots 300-1 and 300-2 to travel from those slots to slots 300-3 and 300-4 below per each CIU clock cycle. Age queue 300 also includes select circuits (multiplexers) 320 and 325 that enable ID tags in slots 300-3 and 300-4 to travel from those slots to slots 300-5 and 300-6 below, per each CIU clock cycle. Age queue 300 further includes select circuits (multiplexers) 330 and 335 that enable ID tags in slots 300-5 and 300-6 to travel from those slots to slots 300-7 and 300-8 below, per each CIU clock cycle. In this manner, ID tags may flow and propagate from the tail (slot 300-1) to the head (slot 300-8) two at a time per each CIU clock cycle. ID tags do not immediately proceed from the head to the tail but rather travel by a fixed rate or amount per CIU clock cycle, namely two slots per clock cycle in this particular example. Older instructions flow downward in age queue 300 by 2 slots per clock cycle while newer instructions from registers REQ0 and REQ1 populate the upper slots from the tail.

As discussed above, the ID tags in age queue slots 300-1, 300-2, . . . 300-8 point to respective request addresses that request queue 305 stores. Age queue slots 300-1, 300-2, . . . 300-8 couple to respective output lines 225-1, 225-2, . . . 225-8 as shown. Output lines 225-1, 225-2, . . . 225-8 together form an 8xN interconnect bus 225 where N is the width of an ID tag. This arrangement provides access to each of the ID tags in slots 300-1, 300-2, . . . 300-8 at any point in time. Arbitration control circuitry 215 generally selects the oldest requests corresponding to the oldest or lowermost ID tags in age queue 300. However, in the event that a request corresponding to a particular ID tag in age queue 300 stalls for lack of a resource or other reason, then the arbitration control circuit 215 selects the next lowermost ID tag above the ID tag that exhibits the stall. In the disclosed embodiment of FIG. 2, leading ones detector 255 performs this selection by determining the lowermost ID tag in age queue 300 that corresponds to a request for which the lowermost ready bit vector value is a logic 1. The resultant enable bit vector 260 then provides a "1 hot" pointer to the corresponding winning request address in request queue 305. CIU 200 then sends or dispatches that winning load request for attempted execution.

Figure 4:
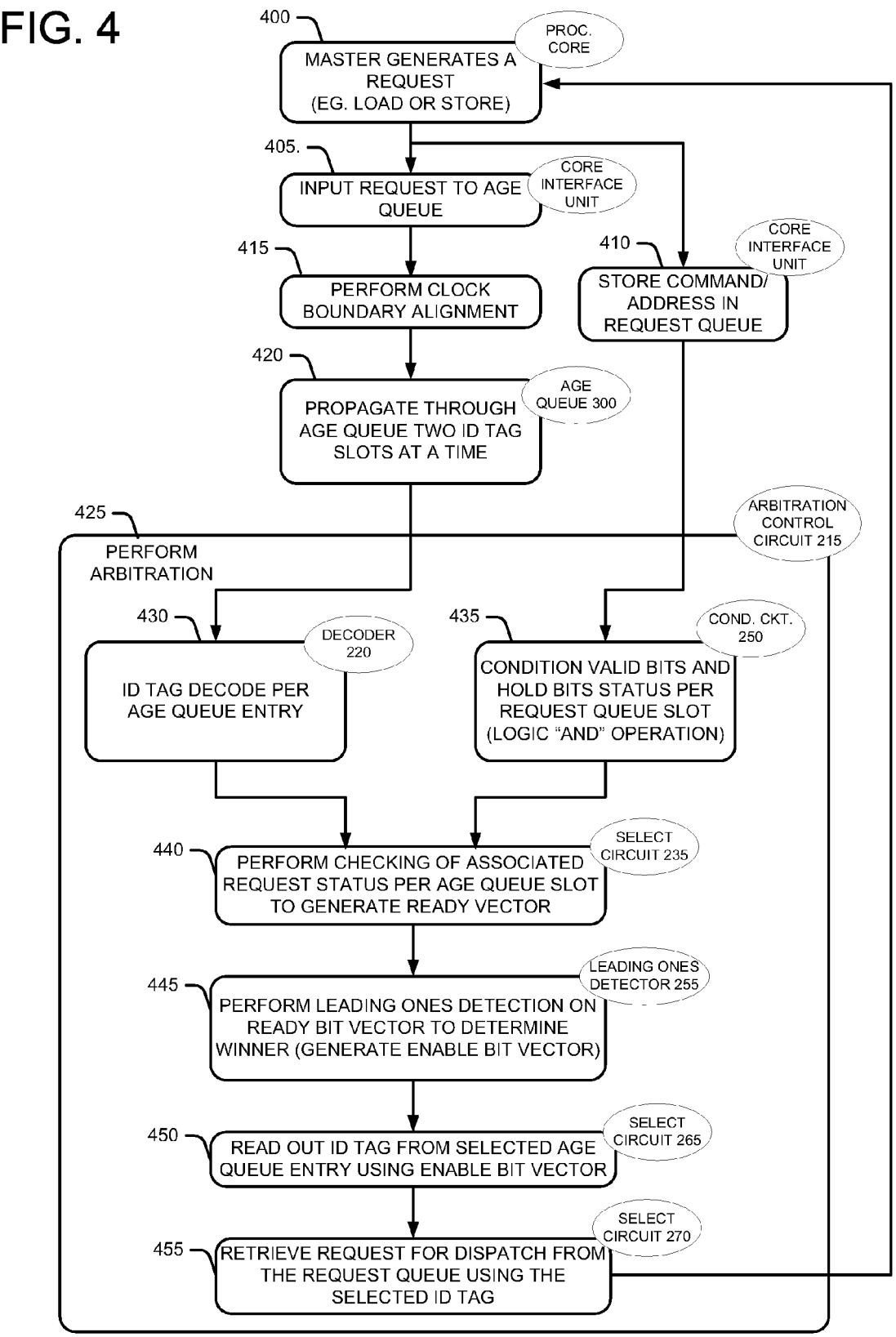
FIG. 4 is a flowchart of process flow in the core interface unit of the disclosed processor.

FIG. 4 is a flowchart that depicts process flow in the disclosed age queue memory request handling methodology. Process flow commences when a master generates a load request, as per block 400. A master may be any request generator in an information handling system that requests access to memory data. For example, a core of a processor may be such a master or request generator, while cache or system memory may be the slave or target. In one embodiment, processor 100 handles load requests out-of order while handling store requests in-order. After the master generates a load request, core interface unit 200 provides the request to age queue 300, as per block 405, and further provides the request to request queue 305, as per block 410. Age queue 300 stores an ID tag corresponding to the address of the request in a slot near the tail of age queue 300. In actual practice, age queue 300 stores the ID tag of the first of two new requests in slot 300-2 and the second of two new requests in slot 300-1. Slot 300-2 thus stores the older of the two instructions provided to the tail of age queue 300. In parallel with block 410 wherein age queue 300 stores an ID tag that corresponds to a particular request, request queue 305 stores the address of the request itself in a slot of the request queue, as per block 410. CIU 200 then performs a clock boundary alignment, as per block 415. The purpose of this clock boundary alignment is to collect 2 requests from the high frequency domain and pass them to the low frequency domain. The ID tags corresponding to two adjacent load requests in time propagate through age queue 300 toward head slot 300-8 at a fixed rate of two slots per CIU clock cycle, as per block 420.

Arbitration control circuit 215 performs arbitration, as per block 425, to determine the next request of the requests in request queue 305 that CIU 200 should attempt to execute. Decode circuit 220 decodes the ID tag corresponding to each age queue entry, as per block 430. Arbitration control circuit 215 conditions the valid bits and hold bits by performing a logical AND operation thereon, as per block 435. Select circuit 235 generates a ready bit vector by checking request status information (valid bits and hold bits) of each request queue slot 305-1, 305-2, . . . 305-8, as per block 440. Leading ones detector 255 generates an enable bit vector, as per block 445, to determine the arbitration winner. Select circuit 265 then reads out the ID tag corresponding to the winner's age queue slot or entry found using the enable bit vector, as per block 450. Select circuit 270 retrieves the winning request, namely the winning request address, by selecting the particular address in request queue 305 that the winning ID tag identifies, as per block 455. Process flow continues bock to block 400 wherein the master generates more requests. In actual practice, the master may continue generating requests while processor 100 carries out the methodology of the FIG. 4 flowchart.

Figure 5:
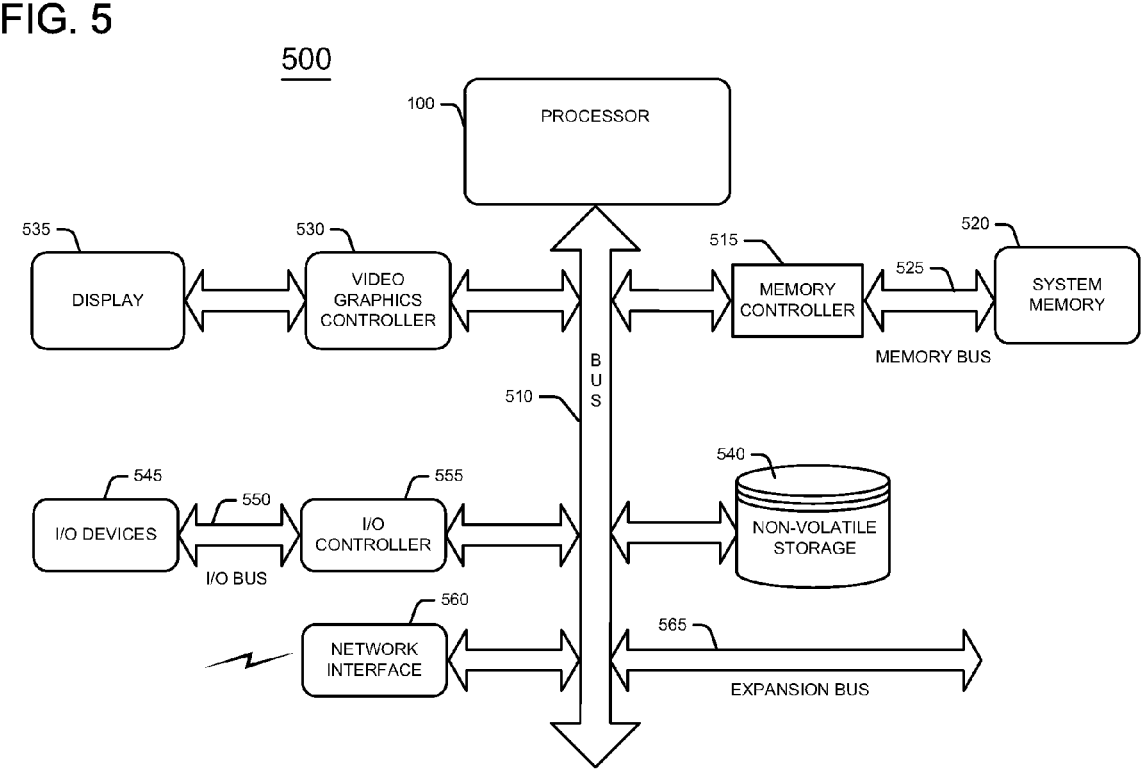
FIG. 5 is a block diagram of an information handling system (IHS) that employs the disclosed processor.

FIG. 5 is a block diagram of an information handling system (IHS) 500 that employs processor 100. IHS 500 includes a processor 100 that couples to a bus 510. A memory controller 515 couples system memory 520 to bus 510 via a memory bus 525. A video graphics controller 530 couples display 535 to bus 510. IHS 500 includes nonvolatile storage 540, such as a hard disk drive, CD drive, DVD drive, or other nonvolatile storage that couples to bus 510 to provide IHS 500 with permanent storage of information. Nonvolatile storage 540 is a form of data store. An operating system (OS) loads from nonvolatile storage 540 to memory 520 to govern the operation of client IHS 500. I/O devices 545, such as a keyboard and a mouse pointing device, couple via I/O bus 550 and I/O controller 555 to bus 510. One or more expansion busses 565, such as USB, IEEE 1394 bus, ATA, SATA, PCI, PCIE and other busses, couple to bus 510 to facilitate the connection of peripherals and devices to IHS 500. A network interface 560 couples to bus 510 to enable IHS 500 to connect by wire or wirelessly to a network and other IHSs. IHS 600 may take many forms. For example, IHS 500 may take the form of a desktop, server, portable, laptop, notebook, or other form factor computer or data processing system. IHS 500 may also take other form factors such as a personal digital assistant (PDA), a gaming device, a portable telephone device, a communication device or other devices that include a processor and memory.

The foregoing discloses a processor and processor methodology that, in one embodiment, employs an age queue to track the oldest entry in a request queue that stores load requests and dispatches that entry for execution based upon its seniority and readiness. In one embodiment, the processor employs an age queue that handles load requests coming into the age queue at a frequency twice that of the age queue and request queue internal operating frequency. The age queue stores ID tags corresponding to the respective incoming requests based on the order in which the age queue receives the requests. The request queue stores the actual requests while the age queue stores respective ID tags corresponding to the received requests. The age queue effectively registers the ID tags of the incoming request into the top or tail of the age queue at the lower internal operating frequency. After entering the age queue, the ID tags of the requests propagate to the bottom or head of the age queue, moving at a fixed rate of at most 2 slots at a time in one embodiment. ID tags of older requests propagate toward the bottom of the age queue to allow younger instructions to enter the two top slots of the age queue.

The request queue stores valid and hold status information on a per queue entry basis. In one embodiment, the age queue does not reproduce or replicate this status information. However, arbitration control circuitry taps into this status information to determine the readiness of a request for dispatching. The arbitration control circuitry generates a ready bit vector to mark each entry that may potentially be ready for dispatching. A leading ones detection circuit identifies the oldest ready request closest to the bottom of the age queue. The leading ones detection circuit generates an enable bit vector to allow selection circuitry to read out the ID tag of the entry that the enable bit vector selects from the age queue. This ID tag is the winning ID tag that identifies the result of arbitration, namely the particular request in the request queue that the core interface unit should next dispatch to an L2 cache or other appropriate memory for execution.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of servicing load requests in a processor, comprising:

generating, by a processor core, a plurality of load requests, each load request exhibiting an address;

receiving, by a core interface unit, the load requests at an input of the core interface unit;

storing, by a request queue in the core interface unit, the load requests in respective slots of the request queue;

storing, by an age queue in the core interface unit, ID tags in respective slots of the age queue, each ID tag in the age queue identifying the address of a respective load request in the request queue, the age queue including a tail at which ID tags enter the age queue, the age queue further including a head; and advancing, by the age queue, ID tags from the tail of the age queue toward the head of the age queue by a fixed rate corresponding to a predetermined number of age queue slots per clock cycle, the positions of the ID tags within the age queue indicating the relative ages of respective load requests in the request queue.

2. The method of claim 1, further comprising storing, by the request queue, valid bits in the respective slots of the request queue, each valid bit indicating if the respective slot stores a valid load request or an invalid load request.

3. The method of claim 2, further comprising storing, by the request queue, hold bits in the respective slots of the request queue, the hold bit of a request queue slot indicating if the load request in that request queue slot is being prevented from dispatch.

4. The method of claim 3, further comprising arbitrating, by arbitration control circuitry, to determine the next load request in the request queue to dispatch.

5. The method of claim 4, wherein the arbitrating step includes analyzing the valid bits and hold bits in the request queue to generate a ready bit vector that identifies load requests in the request queue that are potentially ready to dispatch.

6. The method of claim 5, wherein the arbitrating step further includes generating an enable bit vector that identifies an oldest load request of the load requests in the request queue that are potentially ready to dispatch.

7. The method of claim 6, wherein arbitrating step employs a leading ones detector to identify the oldest load request of the load requests in the request queue that are potentially ready to dispatch.

8. The method of claim 1, wherein the fixed rate is 2 age queue slots per processor core clock cycle.

9. The method of claim 1, wherein the core interface unit exhibits an input frequency that is a multiple of an internal operating frequency of the core interface unit.

10. The method of claim 1, wherein the age queue includes a number of slots equal to the number of slots in the request queue.

11. A processor comprising:

a processor core that generates a plurality of load requests, each load request exhibiting an address;

a core interface unit, coupled to the processor core, that receives the plurality of requests from the processor core, the core interface unit including:

an input that receives the load requests;

a request queue, coupled to the input, that includes a plurality of request queue slots that store the respective load requests;

an age queue, coupled to the input, that includes a plurality of age queue slots that store respective ID tags, each ID tag in the age queue identifying the address of a respective load request in the request queue, the age queue including a tail at which ID tags enter the age queue, the age queue further including a head, wherein the age queue ID tags advance from the tail of the age queue toward the head of the age queue by a fixed rate corresponding to a predetermined number of age queue slots per processor core clock cycle, the positions of the ID tags within the age queue indicating the relative ages of respective requests in the request queue; and a memory, coupled to the core interface unit, that stores data specified by the load requests.

12. The processor of claim 11, wherein the memory is one of a cache memory and system memory.

13. The processor of claim 11, wherein the request queue stores valid bits in the respective slots of the request queue, each valid bit indicating if the respective slot stores a valid request or an invalid request, wherein the request queue further stores hold bits in the respective slots of the request queue, the hold bit of a request queue slot indicating if the request in that request queue slot is being prevented from dispatch.

14. The processor of claim 11, wherein the core interface unit includes an arbitration control circuit, coupled to the age queue and the request queue, that determines a next request in the request queue to dispatch, the arbitration control circuit analyzing the valid bits and hold bits in the request queue to generate a ready bit vector that identifies requests in the request queue that are potentially ready to dispatch, the arbitration control circuit generating an enable bit vector that identifies an oldest request of the requests in the request queue that are potentially ready to dispatch.

15. The processor of claim 14, wherein the arbitration control circuit includes a leading ones detector that processes the enable bit vector to identify the oldest request of the requests in the request queue that are potentially ready to dispatch.

16. The processor of claim 11, wherein the fixed rate is 2 age queue slots per processor core clock cycle.

17. The processor of claim 11, wherein the core interface unit exhibits an input frequency that is a multiple of an internal operating frequency of the core interface unit.

18. The processor of claim 11, wherein the age queue includes a number of slots equal to the number of slots in the request queue.

19. An information handling system (IHS), comprising:

a processor including:

a processor core that generates a plurality of load requests, each load request exhibiting an address;

a core interface unit, coupled to the processor core, that receives the plurality of requests from the processor core, the core interface unit including:

a request queue that includes a plurality of request queue slots that store the respective load requests;

an age queue that includes a plurality of age queue slots that store respective ID tags, each ID tag in the age queue identifying the address of a respective load request in the request queue, the age queue including a tail at which ID tags enter the age queue, the age queue further including a head, wherein the age queue ID tags advance from the tail of the age queue toward the head of the age queue by a fixed rate corresponding to a predetermined number of age queue slots per processor core clock cycle, the positions of the ID tags within the age queue indicating the relative ages of respective requests in the request queue; and a memory coupled to the processor.

20. The IHS of claim 19, wherein the core interface unit exhibits an input frequency that is a multiple of an internal operating frequency of the core interface unit.

* * * * *